United States Patent [19]
Cripe

[11] Patent Number: 5,509,605
[45] Date of Patent: Apr. 23, 1996

[54] FILTERING STRAW

[75] Inventor: Gerry D. Cripe, Goshen, Ind.

[73] Assignee: Hydro-Life, Inc., Bristol, Ind.

[21] Appl. No.: 293,497

[22] Filed: Aug. 19, 1994

[51] Int. Cl.$^6$ .......................... B01D 35/02; A47G 21/18
[52] U.S. Cl. ................................. 239/33; 210/266
[58] Field of Search .................. 239/33; 210/266, 210/282, 501

[56] References Cited

U.S. PATENT DOCUMENTS

| | | | |
|---|---|---|---|
| 4,995,976 | 2/1991 | Vermes et al. | 210/266 |
| 5,045,195 | 9/1991 | Spangrud et al. | 210/266 |
| 5,114,570 | 5/1992 | Nelson et al. | 210/282 X |
| 5,156,335 | 10/1992 | Smith et al. | 239/33 |
| 5,156,737 | 10/1992 | Luna et al. | 210/266 |

FOREIGN PATENT DOCUMENTS 729314  7/1932  France .................... 210/282

*Primary Examiner*—Kevin P. Weldon
*Attorney, Agent, or Firm*—Baker & Daniels

[57] ABSTRACT

A filtering straw for drawing liquid from a container includes a tube with a pair of filters, one filter being removably mounted in each end of the tube. Each of the filters includes a portion extending into the corresponding end of the tube, each of which has an outer circumferential liquid permeable surface cooperating with the inner circumferential of surface of the tube to define an annular chamber therebetween. Accordingly, the cross sectional area through which fluid is drawn by sucking on the straw is the circumferential surface of each filter.

10 Claims, 1 Drawing Sheet

U.S. Patent  Apr. 23, 1996  5,509,605
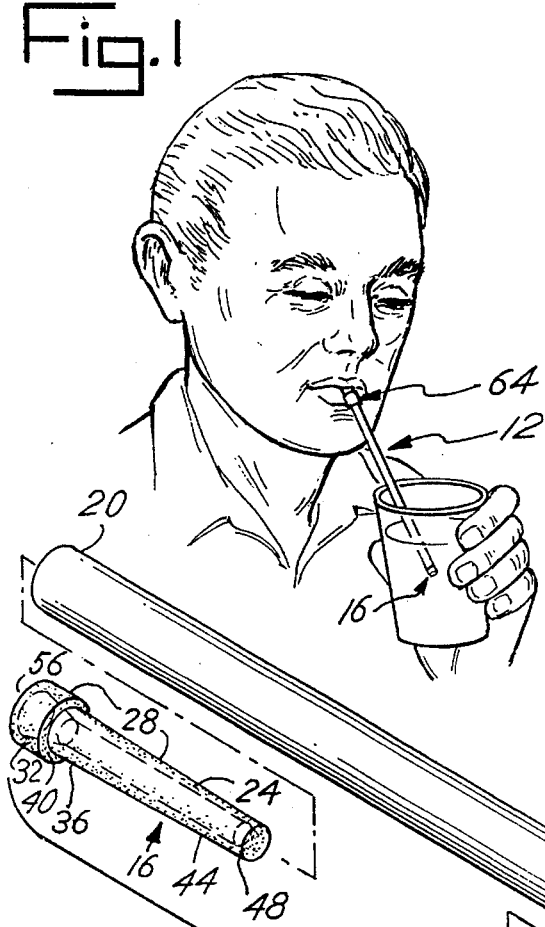
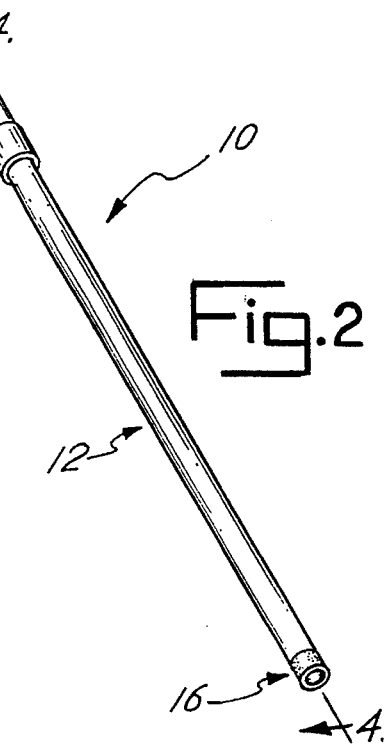
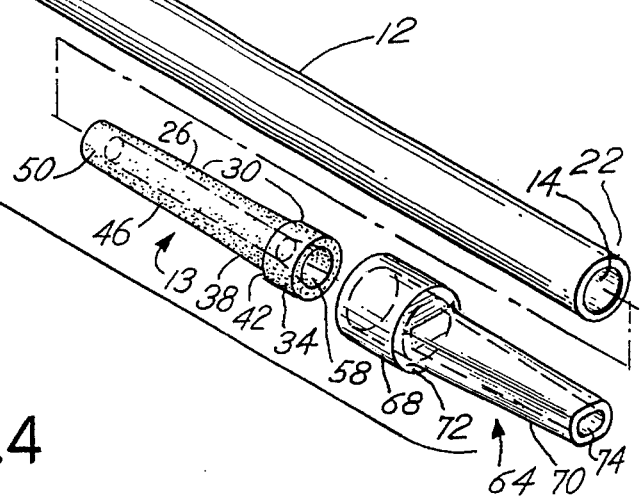
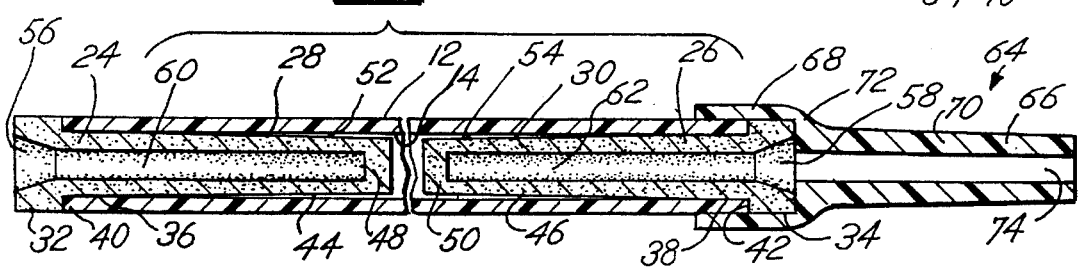

FILTERING STRAW

This invention relates to a filtering straw for drawing liquid from a container.

BACKGROUND OF INVENTION

Various liquids for human consumption contain undesirable impurities. These impurities affect the taste, color and odor of the liquids. Some conventional drinking liquid filtering devices are not portable. The user must either obtain the liquid from, or transport the liquid to, the location of the filtering device in order to obtain a filtered drink. Other conventional devices are not usable with standard drinking containers. Although some of these devices are portable, the user must also carry a special drinking container and transfer the liquid into the container before drinking. These alternatives are either impractical or inconvenient, especially for persons wishing to drink filtered liquids while away from home.

SUMMARY OF INVENTION

This invention provides a filtering straw for drinking liquid. The straw has two filters, one inserted into each end of a tube. The filters, each designed to remove a different type of impurity from the liquid, are easily inserted into and removed from the ends of the tube without the use of tools. The filtering straw is easy to transport and convenient to use in virtually any setting.

Accordingly, an advantage of this invention is that it provides a drinking liquid filtering device that is small, lightweight, and portable.

Another advantage is that the filtering device can be used in conjunction with virtually any type of container.

Another advantage is that the filters used in the device are replaceable, thereby increasing the useful life of the device.

Still another advantage is that two separate types of impurities are removed from the liquid through the use of two different filters.

Other advantages will become apparent upon a reading of the following description.

BRIEF DESCRIPTION OF THE DRAWINGS

A preferred embodiment of the invention has been depicted for illustrative purposes only wherein:

FIG. 1 illustrates operation of the filtering straw.

FIG. 2 is an external view of the filtering straw.

FIG. 3 is an expanded perspective view, partly in section, of the filtering straw in a disassembled state; and FIG. 4 is a cross-sectional view of the fully assembled filtering straw.

DESCRIPTION OF THE PREFERRED EMBODIMENT

The preferred embodiment herein described is not intended to be exhaustive or to limit the invention to the precise form disclosed. It is chosen and described to explain the principles of the invention and its application and practical use to enable others skilled in the art to utilize its teachings.

Referring now to the drawings, a filtering straw, generally designated 10, includes tube 12 which defines inner circumferential surface 14. Tube 12 may be virtually any length, such that filtering straw 10 is long enough to reach the bottom of most common drinking containers. A generally cylindrical filter 16 is removably mounted in one end 20 of tube 12, and a filter 18 is removably mounted in the other end 22 of tube Filters 16 and is are identical except for the material from Which they are made, as will hereinafter be described.

Filters 16 and is include circumferentially extending walls 24 and 26, having outer circumferential surfaces 28 and 30. Outer circumferential surfaces 28 and 30 include stepped portions including larger portions 32 and 34 and smaller portions 36 and 38, defining shoulders 40 and 42 therebetween. Larger portions 32 and 34 are short, cylindrical segments, having outer diameters approximately equal to the outer diameter of tube 12, and define orifices 56 and 58. Orifices 56 and 58 taper inwardly into cavities 60 and 62, which are circumscribed by tapering portions 44 and 46 and terminate with circular, cross-sectional surfaces near the innermost extending ends of tapering portions 44 and 46

As is best shown in FIG. 4, smaller portions 36 and 38 are substantially the same diameter as the inner diameter of tube 12 and engage the latter with an interference fit to hold the filters in place. When filters 16 and is are installed into ends 20 and 22, shoulders 40 and 42 engage the corresponding ends of tube 12 to prevent larger portions 32 and 34 from being forced into tube 12. Tapering portions 44 and 46 extend from smaller portions 36 and 38 and terminate in transversely extending walls 48 and 50, tapering radially inwardly away from inner circumferential surface 14 thereby forming annular chambers 52 and 54 between outer circumferential surfaces 28 and 30 and inner circumferential surface 14.

Mouthpiece 64 includes circumferentially extending wall 66 defining a larger portion 68 and a smaller portion 70, with a shoulder 72 therebetween. Wall 66 also defines an opening 74 that delivers liquid into the mouth of the user. Larger portion 68 is cylindrical, having an inside diameter substantially equal to the outside diameter of tube 12. As is best shown in FIG. 4, larger portion 68 extends over larger portion 34 of filter 18 and engages tube 12 with an interference fit, thereby securing mouthpiece 64 to tube 12 and holding filter 18 in place. Shoulder 72 engages larger portion 34 of filter 18, further holding filter 18 in place. Smaller portion 70, having an elliptical cross-section, extends axially from tube 12.

Tube 12 and mouthpiece 64 may be constructed of any material suitable for repeated washing such as plastic, glass, or ceramic. Filter 16 is made by mixing a binder material with a powdered material which converts chlorine into chloride and is commercially sold by KDF Fluid Treatment company under the trademark "KDF." The mixture is compressed into a mold to form the shape of filter 16 using a process commonly known to those skilled in the art. Filter 18 is produced using a similar process, but includes activated charcoal instead of "KDF."

MODE OF OPERATION

As shown in FIG. 1, liquid is drawn from a container by submerging larger portion of filter 16 therein, and sucking on smaller portion 70 of mouthpiece 64. The liquid enters orifice 56 and cavity 60, then passes through the filtration surface defined by tapering portion 44 and transversely extending wall 48. As the liquid passes through these portions of filter 16, filter 16 reduces the amount of impurities in the liquid by chemically interacting with the impurities. After passing through filter 16, the liquid fills the volume within tube 12 and is then drawn into cavity 62 through the filtration surface defined by transversely extending wall 50 and tapering portion 46. As the liquid passes through these portions of filter 18, filter 18 reduces the amount of impurities in the liquid by chemically interacting with the impurities. The filtered liquid then passes through orifice 58 of filter 18, into mouthpiece 64, and into the user's mouth.

Annular chambers 52 and 54 are important because they provide an increased filtration surface area for filters 16 and 18. If outer circumferential surfaces 28 and 30 did not taper away from, but remained in contact with, inner circumferential surface 14 of tube 12, thereby eliminating annular chambers 52 and 54, the only filtration surfaces through which liquid could pass would be transversely extending walls 48 and 50. This straw 10 design in three ways. First, an increased filtering area more effectively removes impurities from the liquid, thus improving the quality of the filtered liquid. Second, an increased filtering area decreases the suction force required to operate filtering straw 10. Liquid can be drawn out of cavity 60 in any direction through tapering portion 44 and transversely extending wall 48. Similarly, liquid can be drawn into cavity 62 from any direction through tapering portion 46 and transversely extending wall 50. Accordingly, the user can draw liquid through the filters with less suction force than would be required if only transversely extending walls 48 and 50 permitted liquid flow. Finally, an increased filtering area lengthens the useful life of the filters. If the unfiltered liquid was drawn through transversely extending walls 48 and 50 only, then the filtered impurities would become concentrated in those areas and quickly obstruct liquid flow. The configuration herein described distributes the filtered impurities over tapering portions 44 and 46 and transversely extending walls 48 and 50. As a result, more liquid can be filtered before the filters become obstructed and require replacement.

What is claimed is:

1. A filtering straw for drawing liquid from a container comprising:

(a) a tube having a pair of ends, and (b) a pair of filters, each of said filters being removably mounted on said tube, one of said filters including means for removing one type of impurity from said liquid, the other filter including means for removing another type of impurity from the liquid not removed by said one filter, each of said filters being mounted on a corresponding end of said tube and include a portion extending into said corresponding end of the tube, said portion of each filter having an outer circumferential liquid permeable surface cooperating with the inner circumferential surface of the tube to define an annular chamber 2. The filtering straw of claim 1, wherein said outer circumferential surface of each filter includes a portion engaging said inner circumferential surface of said tube and holding the filter in the tube by an interference fit.

3. The filtering straw of claim 1, wherein said outer circumferential surface of each filter includes a tapering portion tapering away from said inner circumferential surface of said tube to define a tapering section of said annular chamber.

4. The filtering straw of claim 1, wherein said outer circumferential surface of each filter is stepped to define larger and smaller portions with a shoulder therebetween, said shoulder engaging the corresponding end of said tube to hold the filter in the tube.

5. The filtering straw of claim 4, wherein said smaller portion extends axially along the inner circumferential surface of said tube.

6. The filtering straw of claim 4, wherein said filtering straw includes a mouthpiece having a circumferentially extending wall defining larger and smaller portions with a shoulder therebetween, said larger portion of one of said filters being held between the corresponding end of the tube and said shoulder of said mouthpiece.

7. The filtering straw of claim 1, wherein said filtering straw includes a mouthpiece carried on one end of the tube, one of said filters being held between said mouthpiece and said one end of the tube.

8. The filtering straw of claim 7, wherein said mouthpiece has a circumferentially extending wall defining larger and smaller portions with a shoulder therebetween, said one filter being held between said shoulder and the corresponding end of the tube.

9. The filtering straw of claim 8, wherein said mouthpiece is removably mounted on said tube to permit removal of the one filter from the tube upon removal of the mouthpiece.

10. The filtering straw of claim 1, wherein said means for removing one type of impurity from said liquid includes activated charcoal.

\* \* \* \* \*